(12) United States Patent
Dufresne et al.

(10) Patent No.: US 6,417,134 B1
(45) Date of Patent: Jul. 9, 2002

(54) EX-SITU PRESULFURATION IN THE PRESENCE OF HYDROCARBON MOLECULE

(75) Inventors: Pierre Dufresne, Valence; Franck Labruyere, St Georges Bains, both of (FR)

(73) Assignee: Europeenne de Retraitement de Catalyseurs Eurecat, La Voulte sur Rhone (FR)

( * ) Notice: Subject to any disclaimer, the term of this patent is extended or adjusted under 35 U.S.C. 154(b) by 0 days.

(21) Appl. No.: 09/415,237

(22) Filed: Oct. 12, 1999

(30) Foreign Application Priority Data

Oct. 12, 1998 (FR) .............................. 98 12739

(51) Int. Cl.$^7$ .............................. B01J 27/047
(52) U.S. Cl. ..................... 502/219; 502/216; 502/217; 502/218; 502/220; 502/221; 502/222; 502/223
(58) Field of Search ............... 502/216, 217, 502/218, 219, 220, 221, 222, 223

(56) References Cited

U.S. PATENT DOCUMENTS

| | | | | |
|---|---|---|---|---|
| 3,453,217 A | * | 7/1969 | Kozlowski et al. ......... | 502/216 |
| 4,530,917 A | * | 7/1985 | Berrebi ..................... | 502/220 |
| 4,943,547 A | * | 7/1990 | Seamans et al. ............ | 502/150 |
| 5,139,983 A | * | 8/1992 | Berrebi et a. ................. | 502/33 |
| 5,338,717 A | | 8/1994 | Aldridge et al. ............ | 502/211 |
| 5,990,037 A | * | 11/1999 | Seamans et al. ............ | 502/216 |

FOREIGN PATENT DOCUMENTS

| | | |
|---|---|---|
| EP | 0 396 206 | 11/1990 |
| EP | 0 564 317 | 10/1993 |
| EP | 0 785 022 | 7/1997 |
| GB | 1 324 034 | 7/1973 |
| GB | 1 553 616 | 10/1979 |

* cited by examiner

*Primary Examiner*—Elizabeth D. Wood
(74) *Attorney, Agent, or Firm*—Millen, White, Zelano & Branigan, P.C.

(57) ABSTRACT

The invention relates to a process for the ex-situ presulfuration of a catalyst for the hydroconversion of hydrocarbons in the presence of hydrogen and of at least one sulfurated compound. It is characterized in that the catalyst is also brought into contact with at least one hydrocarbon compound.

12 Claims, No Drawings

EX-SITU PRESULFURATION IN THE PRESENCE OF HYDROCARBON MOLECULE

FIELD OF THE INVENTION

The invention relates to a process for the ex-situ presulfuration of a catalyst for the hydroconversion of hydrocarbons in the presence of hydrogen and of at least one sulfurated compound.

BACKGROUND OF THE INVENTION

Catalysts for the hydroconversion of hydrocarbons and particularly for the hydro-treatment of petroleum cuts generally contain at least one element of group VIII or group VI of the periodic classification or a combination of several elements from these same groups, deposited on an amorphous oxide support, for example zeolithic such as for example the designated solids .CoMo/$Al_2O_3$, NiMo/$Al_2O_3$ or NiW/$Al_2O_3$. To enable the catalysts to be active for different hydrotreatment reactions, i.e. hydrodesulfuration, hydrodenitrogenization, demetallation or demetallization and certain types of hydrogenation, it is desirable to carry out a sulfuration of the metals with the aim of creating an active phase of the mixed sulfur type. This pre-conditioning stage must be carried out with the greatest care as it conditions the future activity of the product in its subsequent use. It can be carried out according to two different methods. The conventional technique, called in-situ sulfuration, consists of carrying out this pretreatment after loading the catalyst into the hydrocarbons conversion reactor.

The other method of activating this type of catalyst is to carry out an ex-situ sulfuration, i.e. outside the hydrotreatment reactor as described in various patents of the Assignee, for example U.S. Pat. Nos. 4,719,195, 5,139,983, 5,397,756, EP-A 785022.

SUMMARY OF THE INVENTION

The object of the present invention is to carry out an ex-situ presulfuration of the catalyst in the presence of hydrogen and at least one sulfarated compound which can be sulfurated hydrogen or any other compound containing sulfur. The invention is characterized in that, with the aim of improving the sulfuration or presulfaration, the catalyst is brought into contact with at least one hydrocarbon compound. This hydrocarbon compound is added either preferably at a stage before the presulfuration stage, or also before and during the said presulfuration stage.

DETAILED DESCRIPTION OF PREFERRED EMBODIMENTS

Thus, the catalyst is preferably brought into contact with the hydrocarbon compound during a stage before the presulfuration stage. In this case, the hydrocarbon compound can be deposited using any method, for example using the method of dry impregnation of the catalyst by the hydrocarbon compound. This impregnation takes place cold, i.e. at normal temperature. It will most often be enough to introduce the hydrocarbon compound into the porosity of the catalyst at least superficially. It is not necessary to go "to pore volume". Thus, the pore volume of the catalyst is filled completely or at least in part. Preferably, during this treatment, 10 to 100% of the total pore volume of the catalyst is impregnated for example, and more particularly 30 to 100%, by the said hydrocarbon compound.

The said hydrocarbon compound is chosen from the group constituted by the liquid hydrocarbons, but more particularly the compounds containing oxygen, and particularly alcohols, acids, ketones, aldehydes and other compounds containing oxygen. Vegetable oils, nitrogenous compounds, sulfurated compounds, polysulphides (in particular organic), and more particularly also oil bases or base lube oil, for example 150 Neutral (150 N) type, diesel oils and possibly white spirits can also be used. The latter have already been used in earlier catalyst presulfuration procedures, but they were used as vector solvents of sulfurated compounds with which the catalysts (in particular organic polysulfurs) were presulfurated, whereas here the catalyst is firstly impregnated in its porosity with these white spirits.

The sulfuration phase can be carried out at atmospheric pressure in a rotary system heated to between approx. 200 and 500° C. In the case of a gaseous hydrogen/sulfurated hydrogen mixture, the partial sulfurated hydrogen pressures can vary within the range of 0.05 to 0.7. The introduction of the reagents can be carried out at the point of injection of the initial solid or at the point of ejection of the final solid, the sulfuration is thus respectively called co-current sulfuration or counter current sulfuration.

A possible explanation of the benefit brought about by sulfuration in the presence of a carbon compound consists of a thermal effect. The reactions transforming these oxide phases into sulfur phases are very exothermic. If this production of heat is poorly controlled, it can lead to significant heatings of the catalyst bed which, apart from the obvious problems of the safety of the process, can lead to the formation of poorly dispersed sulfur phases. This fritt of the active phase would lead to mediocre catalytic properties. One of the means of improving the control of the temperature at the time of sulfaration consists of impregnating the oxide catalyst with a hydrocarbon compound preferably before the sulfuration stage proper. This addition probably acts as a heat store during the exothermic sulfuration stage and permits an appreciable diminution of the increase in temperature, in particular in the core of the particle. The choice of this hydrocarbon compound will be made from the wide range of organic compounds containing or not containing a functional group.

Another possible explanation of the benefit brought about by this invention can be the following: the mechanism of the sulfuration of an oxide phase like the mixture of $MoO_3$/CoO or NiO oxides supported on alumina involves a complete recomposition and a migration of species to the surface of the support. The structures of the initial and final phases are fully described in the literature. The oxide phase is comprised of well dispersed species at the surface of the alumina such as polymolybdates or tungstates associated with cobalt or nickel oxides. The active phase is structurally very different from this oxide phase. It is in the form of polygonal sheets of molybdenum or tungsten sulfur, generally stacked in a small number from 1 to 5 for conventional preparations, with cobalt or nickel atoms, so-called promoters, being situated on the periphery of these sheets. It is assumed that the catalytic activity is a function of the fine structure of this mixed phase and more precisely of the location of these border atoms, be this in an edge or corner position of these often hexagonal sheets. It is possible to imagine that the necessary migration of species can be influenced by the presence or not of hydrocarbon species on the surface of the solid, thus slightly modifying the structure of the mixed phase. Another hypothesis which can be proposed is that the carbon itself can be part of the active phase and thus directly modify the catalytic properties. This role of the carbon would obviously be different from that, better known, of depositing coke during the product utilization cycle, provoking the progressive reduction in catalyst performance values.

The entire disclosure of all applications, patents and publications, cited above and below, and of corresponding French application 98/12.739, filed Oct. 12, 1998, are hereby incorporated by reference.

EXAMPLES

Example 1 (Comparative)

here, before or during presulfuration, the catalyst is not brought into contact with a hydrocarbon compound.

An oxide catalyst containing 18.9% of $MoO_3$ and 4.2% of CoO and an alumina support is introduced into a rotary oven supplied with a gaseous sulfur-reducing mixture of hydrogen and hydrogen sulphide at respective partial pressures of 0.8 and 0.2 bar, the gas and the solid circulating in counter current. The sulfuration of the solid is obtained by progressively increasing the temperature during the displacement of the solid inside the rotary tube, up to a maximum temperature of 330° C. the residence time inside the oven being approx. 4 hours. After cooling of the solid under reaction atmosphere and purging under nitrogen, this is brought into contact with nitrogen-diluted air so that its temperature remains below 45° C. This sulfurated catalyst can then be handled under air and re-characterized in terms of its sulfur and carbon content (LECO brand apparatus). The level of sulfuration is defined as being the relationship between the measured sulfur content, expressed on a dry basis after correcting the ignition loss at 500° C. and the theoretical content corresponding to the $MoS_2$ and $Co_9S_8$ sulfur phases, i.e. 10.02% sulfur.

Its catalytic evaluation in hydrodesulfuration of a petroleum cut is also carried out. The catalyst test unit is supplied by a synthetic charge with a density of 0.902 and a sulfur content of 1.70% by weight, obtained by mixing equal amounts of LCO (gas oil from catalytic cracking) and direct-distillation gas oil. The hydrogen pressure is 3 MPa (30 bar) and the hourly volume rate VVH $1h^{-1}$, the temperature 330° C. The liquid effluents are collected during a period of 40 hours in stabilized conditions and their sulfur content measured by X-ray fluorescence. The activity of order 1.5 is then calculated and compared to that obtained during a reference test. This is carried out on the oxide catalyst under the same conditions except that the start-up period includes a sulfuration stage in the presence of the direct-distillation gas oil charge to which 7% by weight of dimethyl disulphide has been added. The results are as follows:

|  | Treatment | Sulfuration operating condition | Level of sulfuration before test % | Level of sulfuration after test % | Level of HDS conversion % | HDS activity | Relative activity % |
| --- | --- | --- | --- | --- | --- | --- | --- |
| Example 1 | Ex situ gas phase H2S-H2 | T = 330° C. | 95.2 | 99.6 | 97.00 | 4.28 | 102 |
|  | In situ liquid phase DMDS-H2 | T = 330° C. | — | 100.8 | 96.90 | 4.20 | 100 |

Example 2

According to the Invention

The same $CoMo/Al_2O_3$ catalyst is impregnated at normal temperature by a gas oil (diesel oil) of direct distillation hydrocarbon cut type having initial and final boiling points 250° C. and 350° C. respectively, and a density of 0.837. The impregnated quantity is 39.0% by wt relative to the oxide weight, which corresponds to 90% of the available pore volume. After impregnation, the solid is treated in the rotary oven under the same conditions as in example 1, i.e. 330° C. 4 hours and H2/H2S mixture, then cooling under reaction atmosphere, purging under nitrogen and oxidizing passivation. The level of sulfuration of this catalyst thus obtained is 98.4% and the percentage of residual carbon expressed relative to the oxide base is 3.9% by wt. The difference between the quantity of impregnated carbon and the quantity of residual carbon represents the quantity of hydrocarbons evaporated during the sulfuration phase. The test is carried out as described in example 1, the resulting activity for this type of preparation is improved as indicated below:

| | Treatment | Sulfuration operating condition | Level of sulfuration before test % | Level of sulfuration after test % | Level of HDS conversion % | HDS activity | Relative activity % |
|---|---|---|---|---|---|---|---|
| Example 2 | Ex situ gas oil H2S-H2 | T = 330° C. | 98.4 | 99.6 | 97.27 | 4.54 | 108 |

Example 3

This example is analogous to example no. 2 except that the hydrocarbon source is a 150 Neutral type base mineral oil, with a mass by volume of 0.89 g/cm$^3$ and a viscosity of 119 mm$^2$/s and the quantity of oil impregnated on the oxide base is 12.0% wt which corresponds to ca. 90% of the available pore volume. The analyses carried out on this catalyst show that on completion of this treatment, the solid is perfectly sulfurated and that the quantity of residual carbon is 5.2% by wt relative to the oxide base. The level of hydrodesulfuration activity is again slightly improved compared with the references in example 1.

| | Treatment | Sulfuration operating condition | Level of sulfuration before test % | Level of sulfuration after test % | Level of HDS conversion % | HDS activity | Relative activity % |
|---|---|---|---|---|---|---|---|
| Example 3 | Ex situ gas oil H2S-H2 | T = 330° C. | 101.4 | 102.0 | 97.18 | 4.45 | 106 |

Example 4

The same CoMo/Al1203 catalyst is impregnated at normal temperature by a white spirit type hydrocarbon cut having initial and final boiling points of 180° C. and 220° C. respectively, and a density of 0.70. The impregnated quantity is 8.1% by wt relative to the oxide weight, which corresponds to 20% of the available pore volume. After impregnation, the solid is treated in the rotary oven under the same conditions as in example 1, that is to say 330° C. 4 hours and H2/H2S mixture, then cooling under reaction atmosphere, purging under nitrogen and oxidizing passivation. The level of sulfuration of this catalyst thus obtained is 95.6% and the percentage of residual carbon expressed relative to the oxide base is 0.6% by wt. The difference between the quantity of hydrocarbons evaporated during the sulfuration phase. The test is carried out as described in example 1, the resulting activity for this type of preparation is indicated below:

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the ex-situ presulftrization treatment of a catalyst selected from the group consisting of CoMo/Al$_2$O$_3$, NiMo/Al$_2$O$_3$ and NiW/Al$_2$O$_3$, comprising:

impregnating said catalyst at ambient temperature with a material consisting of a liquid hydrocarbon selected from the group consisting of an oil-base, a diesel oil and white spirits; and contacting the hydrocarbon impregnated catalyst, at a temperature of 200–500° C. directly with a gaseous mixture of hydrogen and hydrogen sulfide for a sufficient time to presulfurize the catalyst, and wherein the step of impregnating is conducted entirely before the contacting step.

2. A process for the ex-situ presulfurization treatment of a catalyst selected from the group consisting of CoMo/Al$_2$O$_3$, NiMo/Al$_2$O$_3$ and NiW/Al$_2$O$_3$, comprising a step of contacting and impregnating said catalyst at ambient temperature with a material consisting of a liquid hydrocarbon selected from the group consisting of an oil-base, a diesel oil and white spirits, and thereafter a step of contacting the hydrocarbon impregnated catalyst, at a temperature of 200–500° C. directly with a gaseous mixture of hydrogen and hydrogen sulfide for a sufficient time to presulfurize the catalyst.

| | Treatment | Sulfuration operating condition | Level of sulfuration before test % | Level of sulfuration after test % | Level of HDS conversion % | HDS activity | Relative activity % |
|---|---|---|---|---|---|---|---|
| Example 4 | Ex situ gas oil H2S-H2 | T = 330° C. | 95.6 | 100.1 | 97.09 | 4.36 | 104 |

3. A process according to claim 2, wherein said presulfurization process consists essentially of said impregnating and contacting steps.

4. A process according to claim 2, further comprising placing the resultant presulfurized catalyst in a reactor.

5. A process according to claim 2 in which the contact between the catalyst and said hydrocarbon compound is carried out before and during the presulfuration treatment.

6. A process according to claim 2 in which at least part of the pore volume of the catalyst is filled by impregnation with said liquid hydrocarbon.

7. A process according to claim 6 in which 10 to 100% of the said pore volume is filled.

8. A process according to claim 6 in which 30 to 100% of the said pore volume is filled.

9. A catalyst produced by a process according to claim 2.

10. A catalyst according to claim 9 in which at least part of the pore volume of the catalyst is filled by impregnation with the said hydrocarbon compound.

11. A catalyst according to claim 10 in which 10 to 100% of the said pore volume is filled.

12. A catalyst according to claim 10 in which 30 to 100% of the said pore volume is filled.

* * * * *

UNITED STATES PATENT AND TRADEMARK OFFICE
CERTIFICATE OF CORRECTION

PATENT NO.    : 6,417,134 B1
DATED         : July 9, 2002
INVENTOR(S)   : Pierre Dufresne et al.

It is certified that error appears in the above-identified patent and that said Letters Patent is hereby corrected as shown below:

Title page,
Item [54], Title, "EX-SITU PRESULFURATION IN THE PRESENCE OF HYDROCARBON MOLECULE" should read -- EX-SITU PRESULFURATION IN THE PRESENCE OF A HYDROCARBON MOLECULE --.

Column 6,
Line 22, "ex-situ presulftrization" should read -- ex-situ presulfurization --.
Lines 41 and 53, "200-500° C. directly" should read -- 200-500° C., directly --.

Signed and Sealed this

Third Day of May, 2005

JON W. DUDAS
*Director of the United States Patent and Trademark Office*